Oct. 14, 1958
R. NEUSCHOTZ
2,855,970
INSERT HAVING FRICTIONALLY RETAINED KEY
WHICH UPSETS THREADS OF BASE MEMBER
Filed May 7, 1956
2 Sheets-Sheet 1
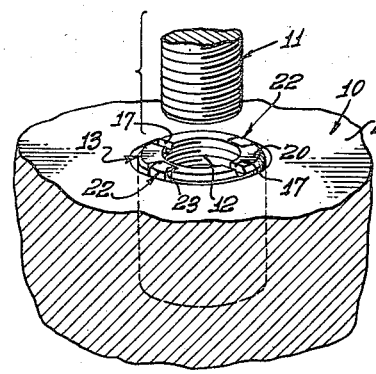
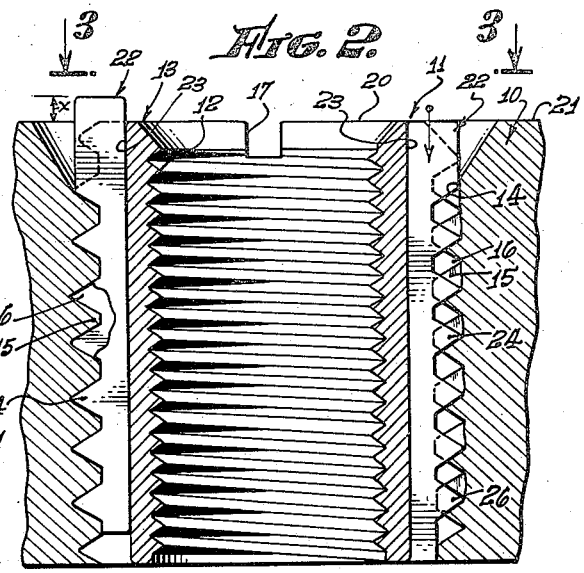
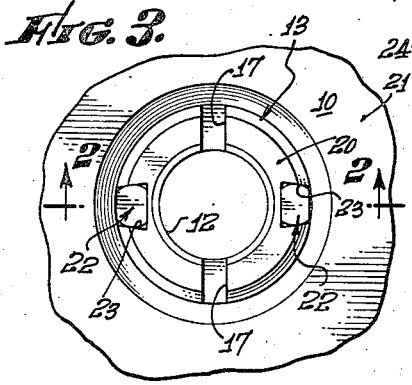
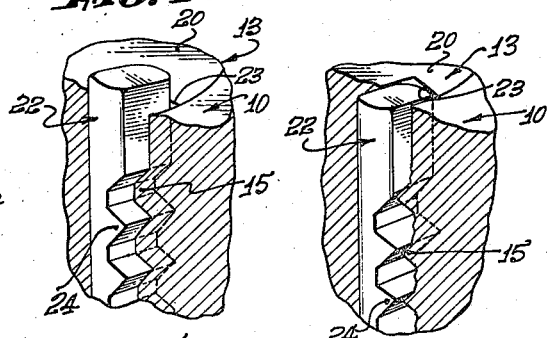
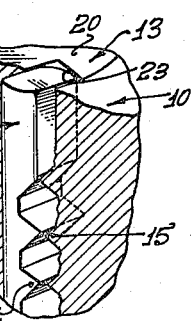
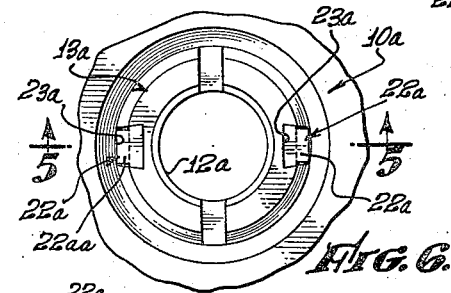
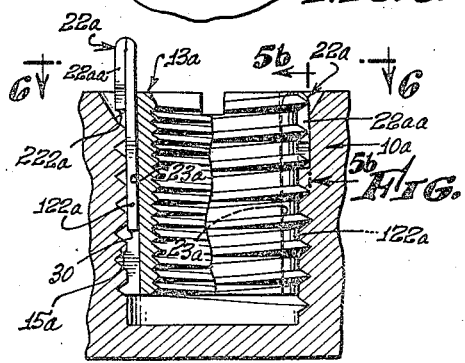
ROBERT NEUSCHOTZ,
INVENTOR.
BY William P. Green
ATTORNEY.

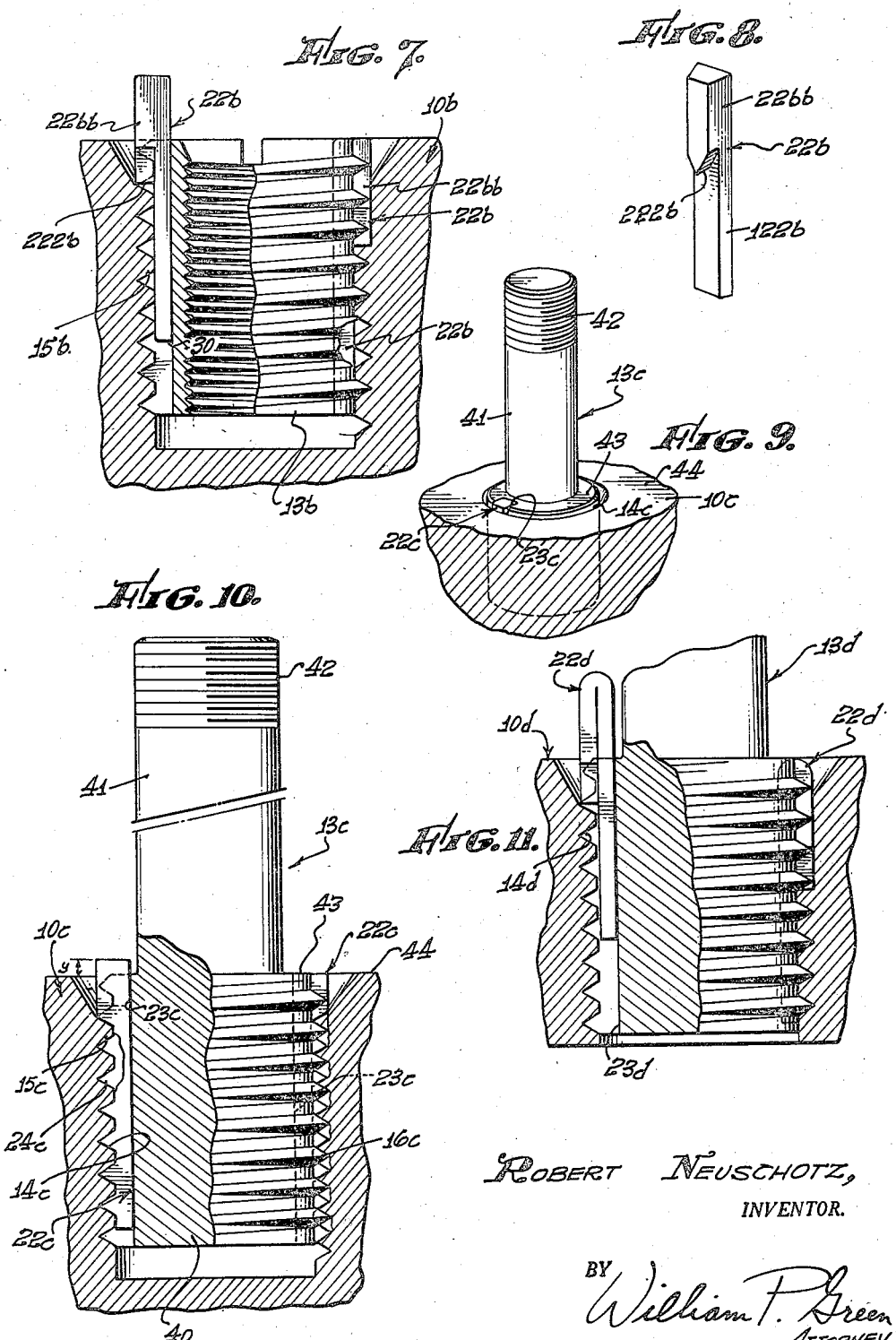

United States Patent Office 2,855,970
Patented Oct. 14, 1958

2,855,970

INSERT HAVING FRICTIONALLY RETAINED KEY WHICH UPSETS THREADS OF BASE MEMBER

Robert Neuschotz, Los Angeles, Calif.

Application May 7, 1956, Serial No. 583,051

10 Claims. (Cl. 151—23)

This invention relates to threaded elements, such as studs or tubular inserts, to be screwed into a threaded opening in an outer carrier member.

The general object of the invention is to provide an improved threaded element of this type, and an improved method of insertion, which will greatly facilitate the positive locking of the element against accidental removal from the opening within which it is received. For this purpose, I employ one or more, preferably two, key parts, each of which is positioned within and axially movable along an essentially axial slot or groove formed in the outer surface of the threaded element. The key is so formed as to not interfere with free screwing of the threaded element into the opening, but to be actuable relative to the threaded element after it is in place, in a manner locking the element within the opening.

More specifically, the key is constructed to be driven essentially axially along the groove in the threaded element, and to deform and actually shear or dig into the threads to which the element is connected, so that the deformation of those threads locks the element in place. For deforming the threads, the key has one or more radially outwardly projecting portions, which in one form of the invention take the form of a series of teeth shaped in conformance to the threads of the threaded element.

To allow for the desired axial shifting of the key, the key is positioned to be accessible after the element is in position, so that a suitable tool may press or drive the key axially. Preferably, the key projects axially outwardly beyond an outer end or shoulder of the threaded element, so that a hammer or the like may very easily engage and displace the key. In order to retain the key in proper position relative to the element prior to use of the assembly and during its insertion, the key and its groove may be of dovetail configuration.

The above and other features and objects of the present invention will be better understood from the following detailed description of the typical embodiments illustrated in the accompanying drawing in which:

Fig. 1 is a perspective view showing an insert assembly embodying the invention as it appears when in use;

Fig. 2 is an axial section taken through the Fig. 1 insert, on line 2—2 of Fig. 3, and showing one of the keys as it appears before it has been driven or pressed axially into locking position, and showing the other key as it appears after its axial locking movement;

Fig. 3 is a plan view taken on line 3—3 of Fig. 2;

Figs. 4a and 4b are fragmentary perspective views showing one of the keys before and after being driven into locking position;

Figs. 5a and 6 are views corresponding to Figs. 2 and 3 respectively but showing a variational form of the invention;

Fig. 5b is a fragmentary view taken on line 5b—5b of Fig. 5a;

Fig. 7 is a view similar to Fig. 2, but showing another variational form of the invention;

Fig. 8 is a perspective view of one of the keys of the Fig. 7 device;

Fig. 9 is a perspective view of a further form of the invention;

Fig. 10 is an enlarged section through the Fig. 9 device, and

Fig. 11 is a view corresponding to Fig. 10, but showing still another form of the invention.

Referring first to Figs. 1 to 4, I have shown at 10 a body of material into which a screw or stud 11 is to be threadedly connected. The threads of stud 11 do not directly contact the material of body 10, but instead engage internal threads 12 within a tubular insert 13. The insert 13 is screwed into an opening or recess 14 in body 10, which opening has internal threads 15 threadedly engaged by external threads 16 formed on insert 13.

Body 10 is normally of a softer material than insert 13. For instance, outer body 10 may be formed of aluminum or other relatively soft metal, while insert 13 may be formed of a harder metal such as steel. The external threads 16 of the insert, and the correspondingly dimensioned internal threads 15 within opening 14, are normally of a susbtantially greater pitch than internal threads 12 and the mating stud threads. At its axially outer end, insert 13 has a pair of alined diametrical slots or recesses 17 adapted to receive the end of a screwdriver to be utilized for screwing insert 13 into opening 14. Preferably, the axially outer transverse surface 20 of insert 13 is flush with or slightly inwardly of the outer surface 21 of body 10 when the insert is fully screwed into position.

For positively locking insert body 13 in its Fig. 1 active position within opening 14, the insert assembly includes one or more, preferably two, axially elongated rigid metal keys 22. Where two such keys are employed, these keys are desirably positioned at diametrically opposite locations, and are typically midway between the locations of a pair of screwdriver recesses 17. Each of the keys 22 is slidably received within an undercut or dovetail shaped groove 23 formed in the outer surface of insert body 13, and preferably extending directly axially of insert body 13. These grooves 23 may extend along the entire axial extent of insert body 13, desirably having a uniform cross sectional configuration along the entire length of each groove. The grooves 23 may have the cross sectional shapes shown in Fig. 3, with the keys 22 having the illustrated essentially very similar cross sectional configurations, so that the dovetail shape of these parts retains the keys very effectively against radially outward movement from within grooves 23. At the same time, keys 22 are free for sliding movement axially within grooves 23, but are sufficiently close fits within the grooves to frictionally retain both of the keys rather effectively in the initial position of the lefthand key in Fig. 2, during handling of the insert assembly, and until the assembly has been screwed into body 10.

For best results, each key 22 should have an axial length corresponding approximately to the axial length of insert body 13, though it is possible in some instances to utilize a somewhat shorter key. The radially outer surface of each key 22 is shaped to form a series of axially spaced radially outwardly extending projections 24, having the same cross sectional shape and spacing and the same helical pitch or inclination as the external threads 16 of insert body 13, and forming continuations or portions of threads 16 when the keys 22 are in their initial positions corresponding to the position of the lefthand key in Fig. 2. In this initial position, the upper or axially outer end of the key projects axially beyond bodies 10 and 13 a distance $x$, which desirably corresponds substantially to one-half the pitch of threads 15 and 16. Keys 22 are of a considerably harder material than outer member 10, so that the keys will be capable of deforming the threads of the outer member when the keys are driven or pressed axially.

In installing one of the insert assemblies 13—22, the first step is to form threads 15 within opening 14 in body 10. Prior to insertion, insert body 13 carries the two keys 22 in the outwardly projecting position of the lefthand key in Fig. 2, in which position the threads 24 of the keys are alined with and form continuations of threads 16 of the insert. In this condition, the insert assembly is screwed into opening 14, so that threads 16 and 24 mesh with internal threads 15 of member 10. The assembly is screwed downwardly to the position of Fig. 2, and keys 22 are then displaced to lock insert body 13 in that Fig. 2 position. More specifically, with insert body 13 in its fully screwed-in position of Fig. 2, and with insert body 13 remaining stationary in that position relative to member 10, keys 22 are driven or pressed axially inwardly, by means of a suitable driving or pressing tool exerting force axially inwardly against outer ends 25 of keys 22. This force is sufficiently great to overcome the frictional resistance to movement of keys 22 within grooves 23, and is sufficiently great to actually deform threads 15 of body 10, as keys 22 are moved through a distance equalling one-half the pitch of threads 15 and to the locking position of the righthand key in Fig. 2. In this position, projections 24 of keys 22 have actually dug axially into and sheared the softer material of threads 15, to the depth indicated in the righthand part of Fig. 2. Such shearing of threads 15 forms abrupt axially extending shoulders 115 on the material of body 10 which bear against and lie in essentially the same planes as the opposite sides 26 of keys 22, so that the engagement of these shoulders with keys 22 positively holds the keys and insert 13 against rotary movement. Thus, the insert assembly is locked in its Fig. 1 active position within member 10.

In the variational form of insert assembly shown in Figs. 5a, 5b and 6, the insert body 13a and outer member 10a may be substantially the same as members 13 and 10 respectively of Fig. 1. However, the two keys 22a are somewhat different than the Fig. 1 keys 22. More specifically, each of the keys 22a in Figs. 4 and 5 may be formed of a flat strip of metal whose thickness may be approximately half the radial extent of grooves 23a, so that the upper or axially outer ends of the keys may be doubled back to extend downwardly at 22aa. The main radially inner portion 122a of key 22a has a radial thickness such that it can be received within groove 23a radially inwardly beyond internal threads 15a of member 10a. Consequently, body 13a may be screwed into opening 14a while portion 122a of key 22a is received within groove 23a, and without any interference to such screwing being offered by the key. The upper portion 22aa of key 22a is relatively short as compared with portion 122a, and portion 22aa may have a width which is slightly smaller than the corresponding width of portion 122a so that the key can be received and retained within dovetail groove 23a. The lower end of portion 22aa of the key may be tapered downwardly to a chisel like point 222a, as seen clearly in Fig. 5b, to effectively dig into and spread the metal of body 10a when the key is driven downwardly.

While the insert 13a is being screwed into opening 14a, keys 22a are both frictionally held in the upwardly or axially outwardly projecting position of the lefthand key 22a in Fig. 4. Thus, the keys do not offer any interference to the screwing of body 13a into member 10a. After the insert 13a has been fully screwed to its Fig. 5 position, a hammer or other driving or pressing tool exerts sufficient downward or axially inward force against the upper ends of keys 22a to drive those keys to the position of the righthand key in Fig. 5. Such axial displacement of the keys deforms the upper threads 15a of members 10a, since portion 22aa of each key is desirably of a thickness to project radially outwardly to the major diameter of threads 15a. Thus, localized portions of threads 15a are actually cut by the chisel shaped pointed ends 222a of keys 22a, and are displaced or spread laterally thereby as the keys are driven downwardly, so that the opposite axially extending side surfaces 27 formed on key portions 22aa above their tapering ends may engage axially extending shoulders formed in the material of member 10a and lying in substantially the planes of surfaces 27. This engagement of the keys with such shoulders formed on member 10a locks insert body 13 very effectively within member 10a.

Figs. 7 and 8 show another slightly variational form of the invention, which is identical with that of Figs. 4 and 5 except as to the manner of formation of keys 22b. In Figs. 7 and 8, each of the keys is formed of a single piece of metal having a portion 122b corresponding to portion 122a in Fig. 4, and having an increased thickness portion 22bb which performs the function of portion 22aa in Fig. 4. Portion 22bb preferably has a lower tapering pointed end 222b corresponding to chisel shaped end 222a of Figs. 5a and 5b, and acting to cut into and spread the material of threads 15b when the key is driven downwardly. As in the other forms of the invention, the keys 22b have a dovetail configuration corresponding essentially to the cross sectional shape of grooves 23b. It is also noted that in both Figs. 4 and 5, the keys initially terminate at a location 30 spaced above the lower end of insert body 13a or 13b, to allow for the downward driving of the keys. Further, keys 22a and 22b should of course be formed of a material which is substantially harder than member 10a or 10b, so that the keys will serve in the desired manner to deform the threads of the outer member without substantial deformation of the keys. The locking action attained by the key of Figs. 7 and 8 is of course the same as the locking action attained in the other forms of the invention. It is further noted that in Fig. 7, and also in Fig. 5, the locking keys preferably initially project upwardly from the body a distance equal to at least about twice the pitch of the external threads on the insert so that the key can be driven axially through that distance.

Figs. 9 and 10 show another form of the invention, in which the element 13c which is to be connected into opening 14c in body 10c is a threaded solid stud, rather than a hollow or tubular insert of the type contemplated by the other forms of the invention. Stud 13c has an enlarged diameter portion 40 which extends into opening 14c and has external threads 16c threadedly engaging internal threads 15c of body 10c. Projecting axially outwardly from body 10c, stud 13c may have a reduced diameter portion 41, typically having threads 42 at its outer end for engaging a coacting nut or other threaded element. At the juncture of enlarged diameter portion 40 and reduced diameter portion 41 of the stud, the stud forms an axially outwardly facing annular shoulder 43, which preferably extends directly transversely of the stud axis, and which may be substantially flush with or slightly inwardly of the plane of outer surface 44 of body 10c, when the stud is in its fully inserted position of Fig. 10.

The device of Figs. 9 and 10 includes two axially slidable keys 22c, which are received within a pair of diametrically opposite axially extending grooves 23c formed in the outer surface of the externally threaded portion 40 of stud 13c. These keys 22c and grooves 23c are of dovetail configuration to retain the keys in the grooves, and may be identical with the keys 22 and grooves 23 of Figs. 1 through 4.

The two keys 22c initially project axially outwardly beyond transverse shoulder 43 a distance Y (see the lefthand key of Fig. 10) corresponding to distance X in Fig. 2. When the keys are in that position, the teeth or thread portions 24c formed on the keys mesh exactly with and form continuations of threads 16c of the stud. The stud 13c is screwed into opening 14c with both of the keys 22c in the above discussed position, in which the keys project the distance Y outwardly beyond shoulder 43. After the stud has been screwed into its Fig. 10 position within opening 14c, keys 22c are driven or pressed axially inwardly to the position of the righthand key in Fig. 10, to thus deform threads 15c of body 10c in the manner previously discussed in connection with Figs. 1 to 4, so that the stud is very positively locked in position within opening 14c.

The final form of the invention shown in Fig. 11 includes a stud 13d which is constructed the same as stud 13c of Figs. 9 and 10, and is connectible into a threaded opening 14d in body 10d. The two keys 22d of Fig. 11 correspond to keys 22a of Fig. 5, and are confined within and guided by a pair of dovetail axially extending grooves 23d formed in body 10d. The operation of keys 22d of Fig. 11 is of course the same as the functioning of keys 22a in Fig. 5, both of the keys initially being in the axially outwardly projecting position of the lefthand key in Fig. 11, and both keys being driven inwardly to the position of the righthand key in that figure after the stud has been screwed into position.

The studs 13c and 13d may be screwed into their bodies 10c and 10d respectively by the use of any suitable tool, such as a conventional stud runner or a suitable wrench engaging a nut or other part which is threadedly connected onto the outer end 42 of the stud. In the case of the various inserts shown in Figs. 1 through 8, these elements are normally screwed into the opening within bodies 10, 10a and 10b by means of a screwdriver engaging the slots or grooves 17. However, it is contemplated that, in some instances, it may be possible to eliminate screwdriver slots 17, and to utilize keys 22, 22a or 22b for screwing the insert into position. That is, since these keys initially project axially outwardly beyond the insert body, the keys can be engaged by a suitable tool, for transmitting the screwing force to the insert through the keys. If desired, the studs 13c and 13d of Figs. 9 to 11 might also be screwed into their respective bodies in the same manner.

It is noted that when any of the various inserts or studs is being screwed into the associated outer member, the upper increased thickness portion of the key inherently functions to limit the extent to which the insert or stud can be screwed in, to thus determine a proper final setting of the parts. For instance, in Fig. 7, the lower edge 222b of portion 22b of each of the keys engages the outer member in the position of the left hand key in that figure, to limit the screwing in of the insert at that properly set position. The keys may then be driven in, with the insert thus positioned, to lock the insert in that position. The same automatic setting feature is also inherent in the other disclosed types of keys, and particularly those of the Fig. 8 type which do not have threads formed in their outer surfaces.

I claim:

1. An insert for installation in a threaded opening in an outer member of relatively weaker material, comprising: a cylindrical body; an exterior thread on said body complementary to and for engagement with the thread in the opening; a generally flat annular surface on said body at one end of said exterior thread adapted to be disposed generally flush with and facing outwardly of the outer end of the opening on installation therein of the insert; a fastening thread carried by said body of less diameter than said exterior thread for detachably fastening a separate element to said body and, consequently, to the member; means defining a recess in said body longitudinally interrupting said exterior thread; a key carried by and normally fixed against movement relative to said body in longitudinal alignment with said recess and projecting outwardly beyond said surface, the major thickness of said key radially of said body being substantially equal to the depth of said recess and the length of said key being not greater than the length of said recess, said key being yieldably mounted on said body for movement longitudinally of said recess on the imposition of a predetermined force longitudinally on said key; and a shoulder on said key adjacent said body surface adapted to longitudinally engage the thread in the member opening at the outer end thereof when the insert is installed therein, whereby said shoulder serves to correctly position the insert in the opening with said surface generally flush with the opening outer end, said key inwardly beyond said shoulder being constructed and arranged to avoid interference with the opening thread so that said body can be screwed freely into the opening, whereby after said body is screwed fully into the opening the outer end of said key can be engaged and driven inwardly substantially flush with said surface so that said key will cut through the opening thread and thus lock said body against rotational movement in the member.

2. The structure defined in claim 1 wherein the recess is a longitudinal groove which interrupts the surface, and the key is frictionally engaged within said groove.

3. The structure defined in claim 1 wherein the depth of the recess is greater than the height of the exterior thread and the key inwardly of the shoulder defines circumferential extensions of the exterior thread.

4. The structure defined in claim 1 wherein the depth of the recess is greater than the height of the exterior thread and the key inwardly of the shoulder has an extension of minor radial thickness that does not project radially outwardly beyond the root of the exterior thread.

5. The structure defined in claim 4 wherein the shoulder is defined by a sharp edge extending radially of the body to facilitate cutting through the opening thread.

6. An insert for installation in a threaded opening in an outer member of relatively weaker material, comprising: a cylindrical body; an exterior thread on said body complementary to and for engagement with the thread in the opening; a generally flat annular surface on said body at one end of said exterior thread adapted to be disposed generally flush with and facing outwardly of the outer end of the opening on installation therein of the insert; a fastening thread carried by said body of less diameter than said exterior thread for detachably fastening a separate element to said body and, consequently, to the member; means defining a recess in said body longitudinally interrupting said exterior thread; a key carried by and normally fixed against movement relative to said body in longitudinal alignment with said recess and projecting outwardly beyond said surface, the major thickness of said key radially of said body being at least equal to about the depth of said recess, said key being yieldably mounted on said body for movement longitudinally of said recess on the imposition of a predetermined force longitudinally on said key; and a shoulder on said key adjacent said body surface adapted to longitudinally engage the thread in the member opening at the outer end thereof when the insert is installed therein, whereby said shoulder serves to correctly position the insert in the opening with said surface generally flush with the opening outer end, said key inwardly beyond said shoulder being constructed and arranged to avoid interference with the opening thread so that said body can be screwed freely into the opening, whereby after said body is screwed fully into the opening the outer end of said key can be engaged and driven inwardly substantially flush with said surface so that said key will cut into the weaker material about the opening and thus lock said body against rotational movement in the member.

7. The structure defined in claim 6 wherein the recess is a longitudinal groove which interrupts the surface, and the key is frictionally engaged within said groove.

8. The structure defined in claim 5 wherein the depth of the recess is greater than the height of the exterior thread and the key inwardly of the shoulder defines circumferential extensions of the exterior thread.

9. The structure defined in claim 5 wherein the depth of the recess is greater than the height of the exterior thread and the key inwardly of the shoulder has an extension of minor radial thickness that does not project radially outwardly beyond the root of the exterior thread.

10. The structure defined in claim 9 wherein the shoulder is defined by a sharp edge extending radially of the body to facilitate cutting through the opening thread.

References Cited in the file of this patent

UNITED STATES PATENTS

| | | |
|---|---|---|
| 407,317 | Aymond et al. | July 23, 1889 |
| 929,532 | Armstrong | July 27, 1909 |
| 1,204,623 | Waller | Nov. 14, 1916 |
| 2,087,114 | Pearlstein | July 13, 1937 |
| 2,367,399 | Isakson | Jan. 16, 1945 |
| 2,400,318 | Rosan | May 14, 1946 |
| 2,400,348 | Greene | May 14, 1946 |
| 2,783,811 | Cummaro | Mar. 5, 1957 |